(12) United States Patent
Stenard

(10) Patent No.: US 12,338,870 B1
(45) Date of Patent: Jun. 24, 2025

(54) SMOOTH TRANSIENT EXCURSION NON-RESONANT (STEN-R) DAMPER

(71) Applicant: John Kevin Stenard, St. Petersburg, FL (US)

(72) Inventor: John Kevin Stenard, St. Petersburg, FL (US)

( * ) Notice: Subject to any disclaimer, the term of this patent is extended or adjusted under 35 U.S.C. 154(b) by 0 days.

(21) Appl. No.: 18/452,354

(22) Filed: Aug. 18, 2023

Related U.S. Application Data

(63) Continuation of application No. 16/869,446, filed on May 7, 2020, now Pat. No. 11,867,249, which is a continuation-in-part of application No. 16/708,430, filed on Dec. 9, 2019, now abandoned.

(51) Int. Cl.
| | | |
|---|---|---|
| *F16F 13/00* | (2006.01) | |
| *F16F 7/08* | (2006.01) | |
| *F16F 15/02* | (2006.01) | |
| *F16F 15/12* | (2006.01) | |
| *F16F 15/129* | (2006.01) | |
| *F16M 13/02* | (2006.01) | |
| *F16D 15/00* | (2006.01) | |

(52) U.S. Cl.
CPC ............ *F16F 13/005* (2013.01); *F16F 7/082* (2013.01); *F16F 7/085* (2013.01); *F16F 15/022* (2013.01); *F16F 15/1201* (2013.01); *F16F 15/1292* (2013.01); *F16M 13/02* (2013.01); *F16D 15/00* (2013.01); *F16F 2222/04* (2013.01); *F16F 2232/08* (2013.01)

(58) Field of Classification Search
None
See application file for complete search history.

(56) References Cited

U.S. PATENT DOCUMENTS

| | | | | |
|---|---|---|---|---|
| 1,654,763 A | * | 1/1928 | Tauscher .................. | F16F 7/06 188/129 |
| 4,093,042 A | * | 6/1978 | Pradon .................. | F16G 11/048 188/189 |
| 5,096,020 A | * | 3/1992 | Korhonen ................. | B66B 5/22 188/43 |

(Continued)

*Primary Examiner* — Melanie Torres Williams
(74) *Attorney, Agent, or Firm* — KILPATRICK TOWNSEND & STOCKTON , LLP; Charles Calkins; Anthony Guebert

(57) ABSTRACT

A device for an extensible and compressible friction-based damper which selectively resists stroking in a first direction while freely sliding in the opposite direction. Resistance is proportional to an adjustable and pre-settable value, which provides and adjustable static-hold capability. Sliding resistance being substantially independent of the relative position, velocity, acceleration or jerk (d3x/dt3) imposed upon it. Dampers according to the present disclosure can eliminate resonance amplification when combined with other conventional suspension components. The damper may be used in applications such as isolation mounts. Also disclosed is a method for a high-performance isolation mount to protect a Payload (persons or equipment) from mechanical shock and vibration, incorporating one or more dampers according to the present disclosure together with one or more elastic elements. A device made according to the present disclosure is dubbed a Smooth Transient Excursion Non-Resonant (STEN-R) Damper.

15 Claims, 4 Drawing Sheets

(56) References Cited

U.S. PATENT DOCUMENTS

| | | | |
|---|---|---|---|
| 7,080,717 B2 * | 7/2006 | Ito .......................... | B66B 5/185 188/65.1 |
| 2008/0128218 A1 * | 6/2008 | Gremaud ................. | B66B 5/22 187/250 |
| 2010/0052232 A1 * | 3/2010 | Valembois ............. | F16F 7/023 267/205 |
| 2014/0041967 A1 * | 2/2014 | Wei ......................... | B66B 5/22 187/350 |
| 2014/0158476 A1 * | 6/2014 | Wei ......................... | B66B 1/32 188/65.1 |
| 2016/0289045 A1 * | 10/2016 | Osmanbasic ......... | F16D 63/008 |

* cited by examiner

SMOOTH TRANSIENT EXCURSION NON-RESONANT (STEN-R) DAMPER

CROSS REFERENCE TO RELATED APPLICATIONS

This application is a continuation of U.S. application Ser. No. 16/869,446, entitled "Smooth Transient Excursion Non-Resonant (Sten-R) Damper", filed on May 7, 2020, which is a Continuation-in-part of U.S. application Ser. No. 16/708,430, entitled, "Automatic-Clutching Friction Damper-Single Direction (ACFD-SD)", and filed on Dec. 9, 2019, now abandoned, which is incorporated herein by reference. U.S. application Ser. No. 16/708,430 claims priority to U.S. Provisional Patent Application No. 62/777,124, entitled "Automatic-Clutching Friction Damper (ACFD)" and filed on Dec. 8, 2018, which is incorporated herein by reference.

BACKGROUND

Isolation mounts may be used in vehicles or buildings to protect payload equipment mounted within them from disturbances comprising both mechanical shock and vibration. Shock events (such as impacts, seismic activity, wave slap, vehicle crashes, weapons effects, gun recoil, bumper cars and other thrill rides, contact sports, and similar phenomena) often induce significant vibration in a frame or structure. Shock phenomena are characterized by high-amplitude force and high-amplitude displacement and can damage equipment with one stroke. Vibrations are cyclic, with lower peak forces and displacements but last longer, and can damage equipment when acting over several cycles of dynamic resonance.

Resonance occurs when the mount natural frequency is close to the disturbance frequency, such that during each cycle more energy is added by the disturbance than is removed by damping. Resonance can theoretically be avoided either by changing the mount natural frequency or adding damping. In practice, changing the natural frequency is the preferred approach as the dampers now available are either too stiff during the shock pulse or too soft to provide enough damping to prevent resonance. Friction dampers do not suffer from those problems but instead stick in place and thus may strand the payload equipment off-center rendering it more vulnerable to subsequent disturbances.

For a given suspended mass, the mount natural frequency can be changed by making the mount stiffer or softer. Making the mount softer makes it better at attenuating vibration but worse at protecting against the initial shock pulse. Softer mounts require a lot more excursion range—relative distance the payload can move—to avoid "hard-bottom" impact. Hard-bottom impacts typically destroy the equipment. The problem is that for many practical isolation-mount applications, making the mount stiff enough to preclude hard-bottoming often results in its natural frequency being close to the vibration frequency of the surrounding support structure, and thus susceptible to resonance amplification. Conventional passive isolation mounts cannot be both firm and soft at the same time. Actively-controlled suspensions can theoretically adjust the mount stiffness from moment to moment, but for some cases such as military vehicles the extra complexity in sensing, processing, and actuation, and the extra power requirements, and the real possibility of losing the active capability upon loss of power make these approaches undesirable.

Conventional isolation mounts include elastomeric, metal spring, and air or gas mounts. One conventional measure to mitigate resonance amplification includes placing dampers in parallel with the mounts, but this adds weight and complexity. Another is to place resilient "snubber" blocks on possible impact surfaces which results in "firm-bottoming", but this takes up valuable space and can still damage the equipment. The most common method of dealing with the resonance problem is to conduct expensive and lengthy redesign, rebuilding, and retesting of the shock mounted assembly.

The key to improving isolation mount performance is improved damping.

SUMMARY

In some embodiments, the present disclosure relates to a device, comprising: a frame assembly which is attachable to a first surface; a slide assembly which is attachable to a second surface, which is slidably connected to the frame assembly such that the device will slide in both extension and compression; a brake assembly, which when biased against the slide assembly is a means for resisting sliding of the device, and which when not biased against the slide assembly adds no substantial resistance to sliding; and a force assembly, which is a means of producing a force which can be used to bias the brake assembly against the slide assembly; and a clutch assembly, which is a means to apply the force produced by the force assembly to bias the brake assembly against the slide assembly when the device slides in a first direction, wherein the first direction is either compression or extension, and which is a means to remove the force produced by the force assembly so as to not bias the brake assembly against the slide assembly when the device slides in the opposite direction.

In some embodiments of the device, the force assembly comprises: at least one spring, which is very broadly defined as a member which can sustain repeated cycles of elastic deformation without impacting the performance of the device and in so doing exerts a force with a vector component substantially aligned in a desirable direction, which explicitly includes the possibility of recognizing the elastic deformations—however slight—of any or all components of the device as contributing to the spring function in some embodiments of the device while also recognizing that their contributions may be negligible in other embodiments of the device which incorporate one or more actual springs; and geometrical features on the frame assembly which are a means to guide or constrain or support the functioning of the force assembly; and other members as may be necessary to guide or constrain or support the functioning of the force assembly as may be necessary, which cooperatively interact with the spring and the geometrical features of the frame assembly to produce a force which when the clutch assembly is in either the transition or clutched modes has a vector component that aligns substantially perpendicularly to the frictional interface between the brake assembly and the slide assembly.

In some embodiments of the device, the force assembly is configured to produce adjustable amounts of force. In some embodiments of the device, the force assembly further comprises a means of setting a specific amount of force. In some embodiments of the device, the friction damper is configured such that the resistance to sliding in the first direction is substantially constant. In some embodiments of the device, the brake assembly and the slide assembly are configured in alternating sandwiching layers such that they establish multiple friction interfaces between them such that when the brake assembly is biased against the slide assembly each of the friction interfaces is biased to substantially the same pressure.

In some embodiments of the device, the clutch assembly further comprises: a trigger, which has at least two opposing faces which are disposed at an acute angle to one another so as to form a wedge-like feature for at least that portion of the member, which when the device is in the clutched configuration wedges between opposing surfaces of the force assembly and the brake assembly thereby coupling the force produced by the force assembly to the brake assembly so as to resist sliding in a first direction, and which when the device is in the unclutched configuration slips to a position of light contact with the force assembly and brake assembly thereby effectively de-coupling the force produced by the force assembly to the brake assembly so as to avoid biasing the brake assembly against the slide assembly, and which when the clutch assembly is in the transition configuration partially couples the force produced by the force assembly to the brake assembly so as to only partially bias the brake assembly against the slide assembly, which is slidably attached to the frame assembly but is constrained to move only a certain finite distance which need not be the same said finite distance that the brake assembly is constrained to slide with respect to the frame assembly, which by virtue of its orientation as disposed with regard to the frame assembly establishes whether the said first direction of movement of the device in which the sliding is resisted is either extension or compression, in which the said first direction of the device is extension is toward the vertex end of the trigger; and at least one spring, which urges the trigger towards its arrow end, in which the urging is nominally light but still sufficient to maintain the trigger in contact with both the force assembly and the brake assembly and thereby to also maintain contact between the brake pads at their frictional interfaces to the slide assembly; and a low-friction bearing, which is disposed between the frame assembly and the backing plate that is on the opposite side of the slide assembly from the trigger, which is a means for substantially eliminating frictional resistance from impeding the switching of configurations.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally relates to the field of isolation mounting to attenuate the transmission of shock, vibration, and acoustic energy from one surface to another, and more particularly addresses methods of protecting susceptible payloads (personnel and equipment) from damage or injury due to exposure to excessive mechanical shock and vibration. In particular, the present disclosure pertains to a device for an extensible and compressible friction-based damper which can be used by itself or in combination with other typical suspension components such as springs as viscous dampers to comprise a desired isolation mount. The device selectively resists sliding in a first direction while freely sliding in the opposite direction. Resistance is proportional to an adjustable and pre-settable value, which also provides an adjustable static-hold capability with regard to sliding in the first direction. Sliding resistance being substantially independent of the relative position, velocity, acceleration, or jerk (d3x/dt3) imposed upon it. Dampers according to the present disclosure can eliminate resonance amplification when combined with other conventional suspension components in an isolation mount. The damper may be used in applications such as isolation mounts. A method for a high-performance isolation mount to protect a Payload (persons or equipment) from mechanical shock and vibration, incorporating one or more dampers according to the present disclosure together with one or more elastic elements. A device made according to the present disclosure is dubbed an Smooth Transient Excursion Non-Resonant (STEN-R) Damper.

Figure 1:
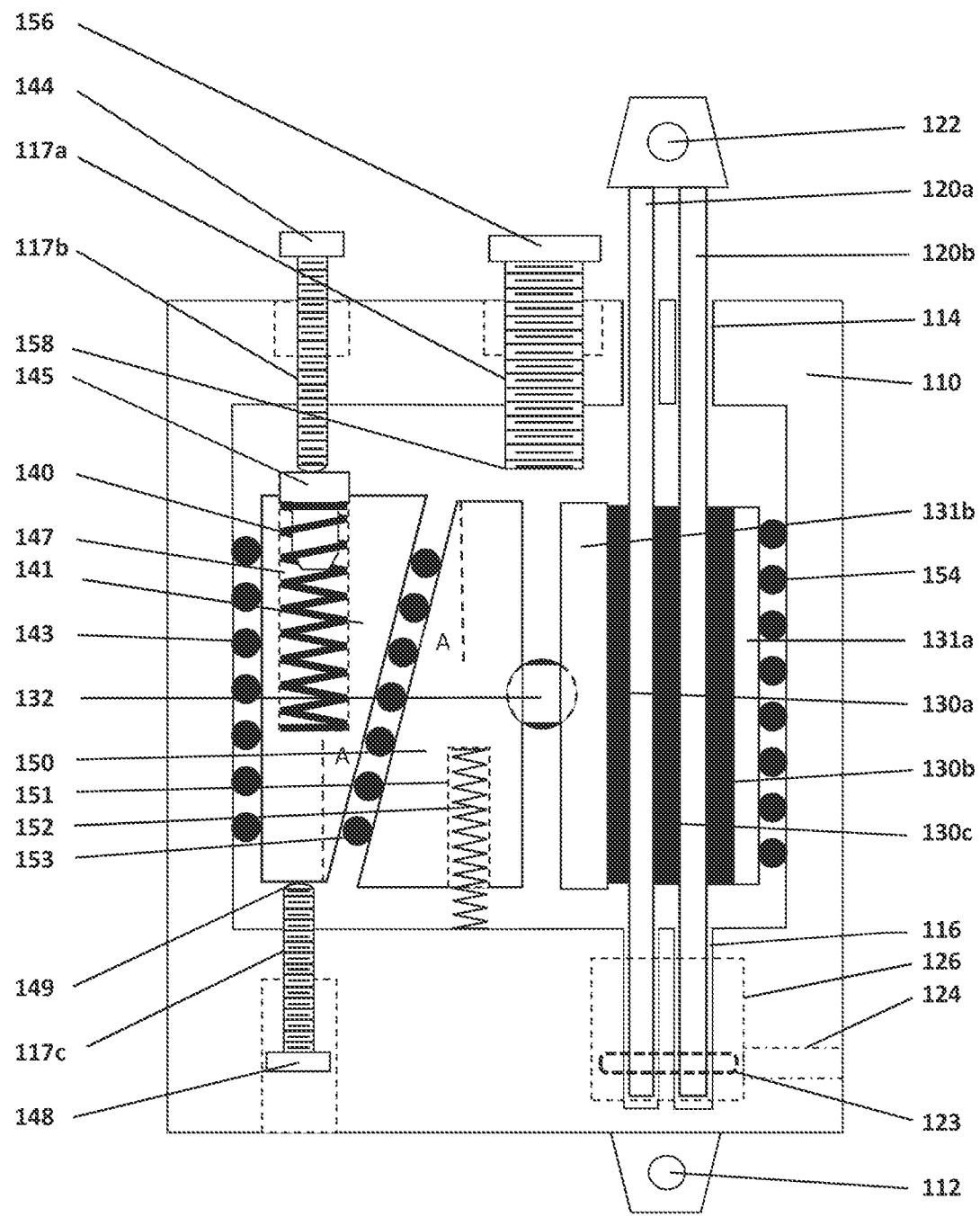
FIG. 1 is a cross-sectional view of an exemplary embodiment with certain aspects, including a housing, two slide bars and three brake pads forming four frictional interfaces, three low-friction interfaces which facilitate relative translation, a ball swivel interface, three adjustable aspects, and a clutch which is oriented to resist extension.

FIG. 1 shows a device which is an embodiment with certain aspects. A frame (housing) 110 is attachable to a first surface at attachment fitting (clevis, ball end, eye) 112. Cover plates run parallel to the drawing plane and span the front and back of frame 110 and are fastened to it by conventional means but are omitted from the drawing for clarity. Frame 110 can be fabricated many ways, including forming or subtractive or additive manufacturing, or being based on an extrusion with the internal parts slid in through the openings and then capped. Slide bars (rod, tube, angle, extruded shape) 120*a* and 120*b* are attachable to a second surface at attachment fitting (clevis, ball end, eye) 122, and are slidably attached to frame 110 passing through milled slots (holes, profile openings) 114 at the top of FIG. 1 and through milled slots (holes, profile openings) 116 lower on FIG. 1. The slide bars 120*a* and 120*b* can slide an indefinite length with respect to the frame 110. An end stop pin (retainer, snubber) 123 is installed cross-wise through both slide bars 120*a* and 120*b* to keep them from sliding too far out of the frame 110. The pin 123 can be installed through access hole 124 and threaded into a tapped hole in one of the bars 120*a* or 120*b*. A cavity 126 accommodates the movement of the pin 123 when the bars 120*a* and 120*b* are sliding. Many other similar methods to implement an end-stop are known to those skilled in the art. Brake pad 130*c* is sandwiched between bars 120*a* and 120*b*. Each of the brake pads 130*a*, 130*b*, and 130*c* is slidably attached to both the frame 110 and the slide bars 120*a* and 120*b*. Each of the brake pads 130*a*, 130*b*, and 130*c* can slide an indefinite distance with respect to the bars 120*a* and 120*b*. Each of the brake pads 130*a*, 130*b*, and 130*c* can slide with respect to the frame 110 until contacting the inside top or inside bottom surfaces of the frame 110. Brake pad 130a is bonded to backing plate (strongback, spreader plate, spreader) 131a. Brake pad 130b is bonded to backing plate 131b. Plate 131b is slidably connected to frame 110, and slides with brake pad 130b.

Though this embodiment has two slide bars 120a and 120b, and three brake pads 130a, 130b, and 130c, an indefinite number of each could be added, one of each at a time in keeping with the sandwiching pattern. There could be more than one piece of material comprising a brake pad in each sandwiched layer, but for simplicity only one is shown. The brake pad also need not be homogenous, as each layer could have several sections each of which is optimized for a given sliding velocity. Also, though the slide bars are shown as having a rectangular cross section, this need not be the case, and different cross-sectional profiles of slide bar could have multiple faces that could accommodate a plurality of brake pads, per sandwiched layer. In this embodiment, there are four frictional interfaces, one between brake pad 130a and slide bar 120a, one between slide bar 120a and brake pad 130c, one between brake pad 130c and slide bar 120b, and one between slide bar 120b and brake pad 130b.

Continuing with FIG. 1, a ball swivel (spherical bearing, all-way rocker) 132 is interposed between plate 131a and a member dubbed a trigger 150. Ball swivel 132 is cupped in a low-friction spherical cavity in plate 131a, and in a mirror-image low-friction spherical cavity in trigger 150. Trigger 150 has two opposing surfaces which are disposed at an acute angle to one another. An opening 151 in the trigger 150 accommodates the trigger spring 152 which urges the trigger 150 toward the vertex of the intersection of the two half-planes lying on the two opposing surfaces disposed at an acute angle to one another (the wedge vertex, although the trigger need not have an overall wedge shape). The spring 152 urges with a relatively light force. A set of rollers 154 is interposed between plate 131b and the right inside right wall of the frame 110. The rollers 154 are constrained by a retaining cage, not shown. The rollers 154 could be replaced by balls or similar low-friction interface. A set of rollers 153 is interposed between trigger 150 and a member dubbed a power wedge 141. The rollers are constrained by a retaining cage, not shown. The rollers 153 could be replaced by a set of balls or similar low-friction interface. A set of rollers 143 is interposed between power wedge 141 and the inside left wall of frame 110. The rollers are constrained by a retaining cage, not shown. The rollers 143 could be replaced by a set of balls or similar low-friction interface. Power wedge 141 has two opposing surfaces which are disposed at an acute angle to one another. An opening 147 in the power wedge 141 accommodates the power spring 140 which urges the power wedge 141 toward the vertex of the intersection of the two half-planes which lie on the two opposing surfaces disposed at an acute angle to one another (the wedge vertex, although the power wedge need not have an overall wedge shape). The spring 140 urges with a relatively strong force. A plunger 145 contacts spring 140. A power spring tensioning screw 144 threads through a tapped hole 117b in the frame 110 and contacts plunger 145. The power wedge adjustable stop screw 148 threads through frame 110 at tapped hole 117c. Power wedge 141 contacts screw 148 at power wedge adjustable hard stop 149. The depth of screw 148 establishes the position of power wedge adjustable hard stop 149. The trigger adjustable stop screw 156 threads through the frame 110 at tapped hole 117a. The depth of screw 156 establishes the position of the trigger adjustable hard stop 158. The vertex end of trigger 150 points toward stop 158.

Figure 2:
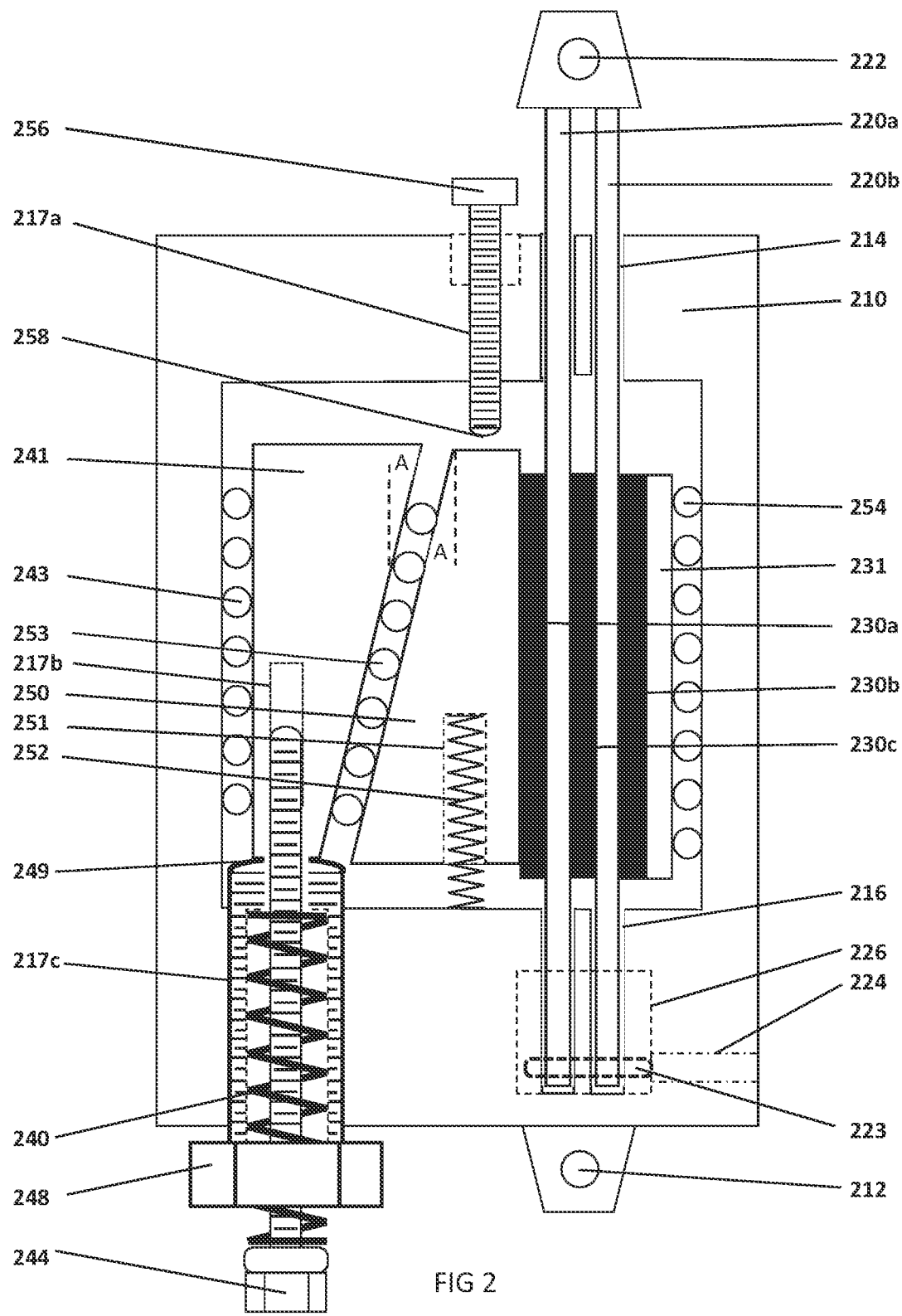
FIG. 2 is a cross-sectional view of an embodiment that is a variant of the embodiment of FIG. 1, but with no ball swivel interface, and a different means of applying and adjusting the force to the force assembly.

FIG. 2 shows a device which is an embodiment with certain aspects. A frame (housing, shell, backbone) 210 is attachable to a first surface at attachment fitting (clevis, ball end, eye) 212. Cover plates run parallel to the drawing plane and span the front and back of frame 210 and are fastened to it by conventional means but are omitted from the drawing for clarity. Frame 210 can be fabricated many ways, including forming or subtractive or additive manufacturing, or being based on an extrusion with the internal parts slid in through the openings and then capped. Slide bars (rod, tube, angle, extruded shape) 220a and 220b are attachable to a second surface at attachment fitting (clevis, ball end, eye) 222, and are slidably attached to frame 210 passing through milled slots (holes, profile openings) 214 at the top of the FIG. 2 and through milled slots (holes, profile openings) 216 lower on FIG. 2. The slide bars 220a and 220b can slide an indefinite length with respect to the frame 210. An end stop pin (retainer, snubber) 223 is installed crosswise through both slide bars 220a and 220b to keep them from sliding too far out of the frame 210. The pin 223 can be installed through access hole 224 and threaded into a tapped hole in one of the bars 220a or 220b. A cavity 226 accommodates the movement of the pin 223 when the bars 220a and 220b are sliding. Many other similar methods to implement an end-stop are known to those skilled in the art. Brake pad 230c is sandwiched between bars 220a and 220b. Each of the brake pads 230a, 230b, and 230c is slidably attached to both the frame 210 and the slide bars 220a and 220b. Each of the brake pads 230a, 230b, and 230c can slide an indefinite distance with respect to the bars 220a and 220b. Each of the brake pads 230a, 230b, and 230c can slide with respect to the frame 210 until contacting the inside top or inside bottom surfaces of the frame 210. Brake pad 230a is bonded to a member dubbed a trigger 250. Brake pad 230b is bonded to backing plate (strongback, spreader plate, spreader) 231b. Plate 231b is slidably connected to frame 210, and slides with brake pad 230b.

Though this embodiment has two slide bars 220a and 220b, and three brake pads 230a, 230b, and 230c, an indefinite number of each could be added, one of each at a time in keeping with the sandwiching pattern. There could be more than one piece of material comprising a brake pad in each sandwiched layer, but for simplicity only one is shown. The brake pad also need not be homogenous, as each layer could have several sections each of which is optimized for a given sliding velocity. Also, though the slide bars are shown as having a rectangular cross section, this need not be the case, and different cross-sectional profiles of slide bar could have multiple faces that could accommodate a plurality of brake pads, per sandwiched layer. In this embodiment, there are four frictional interfaces, one between brake pad 230a and slide bar 220a, one between slide bar 220a and brake pad 230c, one between brake pad 230c and slide bar 220b, and one between slide bar 220b and brake pad 230b.

Continuing with FIG. 2, trigger 250 has two opposing surfaces which are disposed at an acute angle to one another. An opening 251 in trigger 250 accommodates a trigger spring 252 which urges trigger 250 toward the vertex of the intersection of the two half-planes lying on the two opposing surfaces disposed at an acute angle to one another (the wedge vertex, although the trigger need not have an overall wedge shape). Spring 252 urges with a relatively light force. A set of rollers 254 is interposed between plate 231b and the right inside right wall of the frame 210. The rollers 254 are constrained by a retaining cage, not shown. The rollers 254 could be replaced by balls or similar low-friction interface. A set of rollers 253 is interposed between trigger 250 and a member dubbed a power wedge 241. The rollers are constrained by a retaining cage, not shown. The rollers 253 could be replaced by a set of balls or similar low-friction interface. A set of rollers 243 is interposed between power wedge 241 and the inside left wall of frame 210. The rollers are constrained by a retaining cage, not shown. The rollers 243 could be replaced by a set of balls or similar low-friction interface. Power wedge 241 has two opposing surfaces which are disposed at an acute angle to one another. A spring tensioning screw 244 inserts through the coils of a power spring 240 and then into a hole drilled through power wedge position adjusting screw 248, before threading into a tapped hole 217b in power wedge 241. Power spring 240 inserts into a bottoming drilled hole in screw 248. The pre-tension of spring 240 is adjusted by how deeply screw 244 is threaded into power wedge 241. Power spring 240 urges power wedge 241 toward the vertex of the intersection of the two half-planes which lie on the two opposing surfaces disposed at an acute angle to one another (the wedge vertex, although the power wedge need not have an overall wedge shape). Spring 240 urges with a relatively strong force. A power wedge adjustable stop screw 248 threads through frame 210 at tapped hole 217c. The depth of screw 248 establishes the position of power wedge adjustable hard stop 249. The vertex end of power wedge 241 contacts power wedge adjustable hard stop 249. The trigger adjustable stop screw 256 threads through the frame 210 at tapped hole 217a. The depth of screw 256 establishes the position of the trigger adjustable hard stop 258. The vertex end of trigger 250 points toward stop 258.

Figure 3:
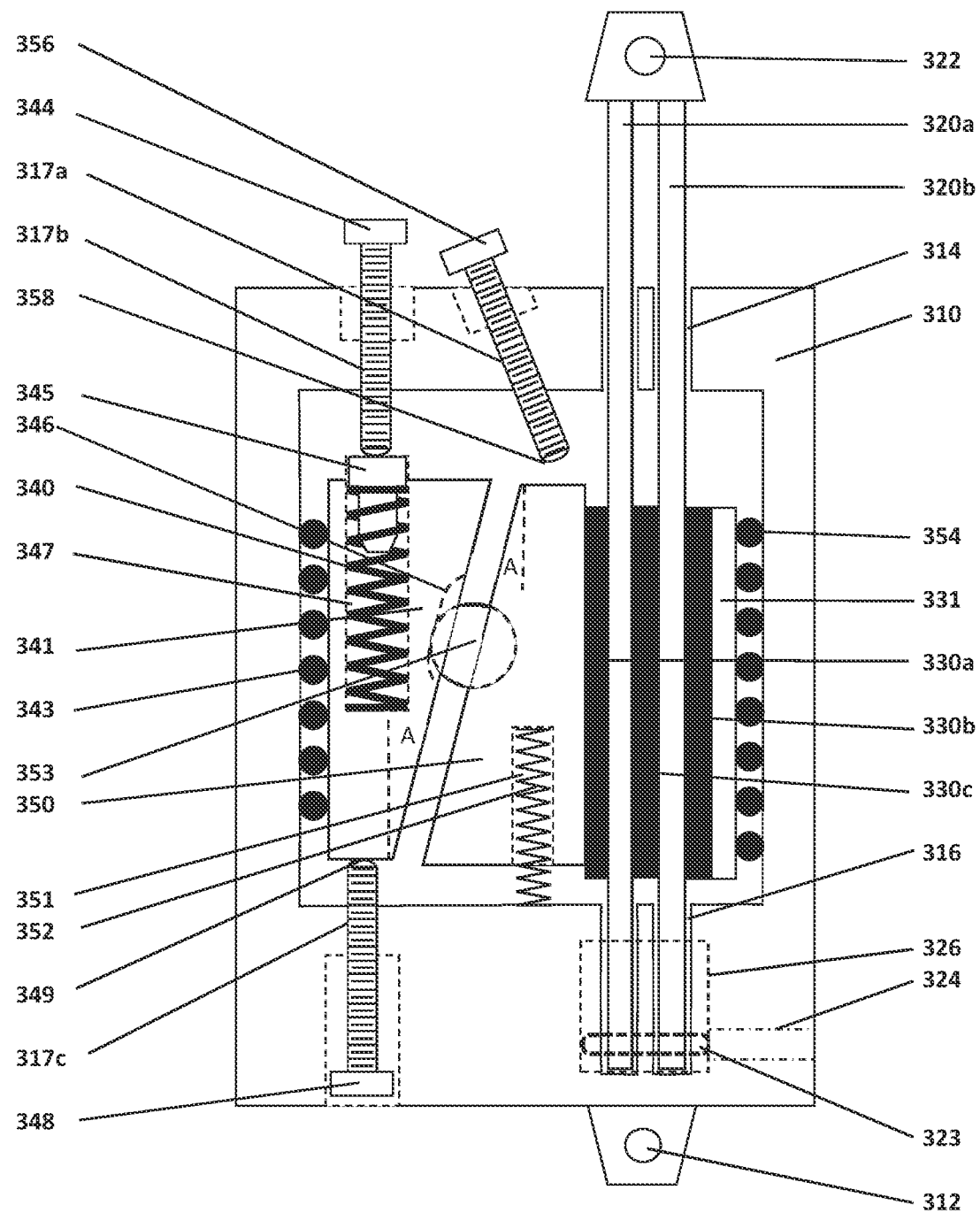
FIG. 3 is a cross-sectional view of an embodiment that is a variant of the embodiment of FIG. 1, but one of the low-friction interfaces which facilitates translation also comprises the features of a ball swivel.

FIG. 3 shows a device which is an embodiment with certain aspects. A frame (housing, shell, backbone) 310 is attachable to a first surface at attachment fitting (clevis, ball end, eye) 312. Cover plates run parallel to the drawing plane and span the front and back of frame 310 and are fastened to it by conventional means but are omitted from the drawing for clarity. Frame 310 can be fabricated many ways, including forming or subtractive or additive manufacturing, or being based on an extrusion with the internal parts slid in through the openings and then capped. Slide bars (rod, tube, angle, extruded shape) 320a and 320b are attachable to a second surface at attachment fitting (clevis, ball end, eye) 322, and are slidably attached to frame 310 passing through milled slots (holes, profile openings) 314 at the top of FIG. 3 and through milled slots (holes, profile openings) 316 lower on FIG. 3. The slide bars 320a and 320b can slide an indefinite length with respect to the frame 310. An end stop pin (retainer, snubber) 323 is installed crosswise through both slide bars 320a and 320b to keep them from sliding too far out of the frame 310. The pin 323 can be installed through access hole 324 and threaded into a tapped hole in one of the bars 320a or 320b. A cavity 326 accommodates the movement of the pin 323 when the bars 320a and 320b are sliding. Many other similar methods to implement an end-stop are known to those skilled in the art. Brake pad 330c is sandwiched between bars 320a and 320b. Each of the brake pads 330a, 330b, and 330c is slidably attached to both the frame 310 and the slide bars 320a and 320b. Each of the brake pads 330a, 330b, and 330c can slide an indefinite distance with respect to the bars 320a and 320b. Each of the brake pads 330a, 330b, and 330c can slide with respect to the frame 310 until contacting the inside top or inside bottom surfaces of the frame 310. Brake pad 330a is bonded to a member dubbed a trigger 350. Brake pad 330b is bonded to backing plate (strongback, spreader plate, spreader) 331b. Plate 231b is slidably connected to frame 310, and slides with brake pad 330b.

Though this embodiment has two slide bars 320a and 320b, and three brake pads 330a, 330b, and 330c, an indefinite number of each could be added, one of each at a time in keeping with the sandwiching pattern. There could be more than one piece of material comprising a brake pad in each sandwiched layer, but for simplicity only one is shown. The brake pad also need not be homogenous, as each layer could have several sections each of which is optimized for a given sliding velocity. Also, though the slide bars are shown as having a rectangular cross section, this need not be the case, and different cross-sectional profiles of slide bar could have multiple faces that could accommodate a plurality of brake pads, per sandwiched layer. In this embodiment, there are four frictional interfaces, one between brake pad 330a and slide bar 320a, one between slide bar 320a and brake pad 330c, one between brake pad 330c and slide bar 320b, and one between slide bar 320b and brake pad 330b.

Continuing with FIG. 3, trigger 350 has two opposing surfaces which are disposed at an acute angle to one another. An opening 351 in trigger 350 accommodates a trigger spring 352 which urges trigger 350 toward the vertex of the intersection of the two half-planes lying on the two opposing surfaces disposed at an acute angle to one another (the wedge vertex, although the trigger need not have an overall wedge shape). Spring 352 urges with a relatively light force. A set of rollers 354 is interposed between plate 231b and the right inside right wall of the frame 310. The rollers 354 are constrained by a retaining cage, not shown. The rollers 354 could be replaced by balls or similar low-friction interface. A low friction interface 353 is comprised of a single ball interposed between trigger 350 and a member dubbed a power wedge 341. The single ball of interface 353 is set into a low-friction spherical cavity on the face of trigger 350. The single ball of interface 353 is set into a low-friction cylindrical cavity 346 on the face of power wedge 341. A set of rollers 343 is interposed between power wedge 341 and the inside left wall of frame 310. The rollers are constrained by a retaining cage, not shown. The rollers 343 could be replaced by a set of balls or similar low-friction interface. Power wedge 341 has two opposing surfaces which are disposed at an acute angle to one another. A spring tensioning screw 244 inserts through a tapped hole 317b in the frame 310 and contacts the blunt end of a plunger 345. The smaller diameter end of plunger 345 inserts in the coils of a power spring 340. Power spring 340 is inserted into an opening 347 in power wedge 341. Power spring 340 urges power wedge 341 toward the vertex of the intersection of the two half-planes which lie on the two opposing surfaces disposed at an acute angle to one another (the wedge vertex, although the power wedge need not have an overall wedge shape). The depth to which screw 344 is threaded determines the pre-tension on power spring 340. Spring 340 urges with a relatively strong force. A power wedge adjustable stop screw 348 threads into a tapped hole 317c in frame 310. The depth of screw 348 establishes the position of power wedge adjustable hard stop 349. The vertex end of power wedge 341 contacts stop 349. A trigger adjustable stop screw 356 threads through the frame 310 at tapped hole 317a. The depth of screw 356 establishes the position of the trigger adjustable hard stop 358. The vertex end of trigger 350 points toward stop 358.

Figure 4:
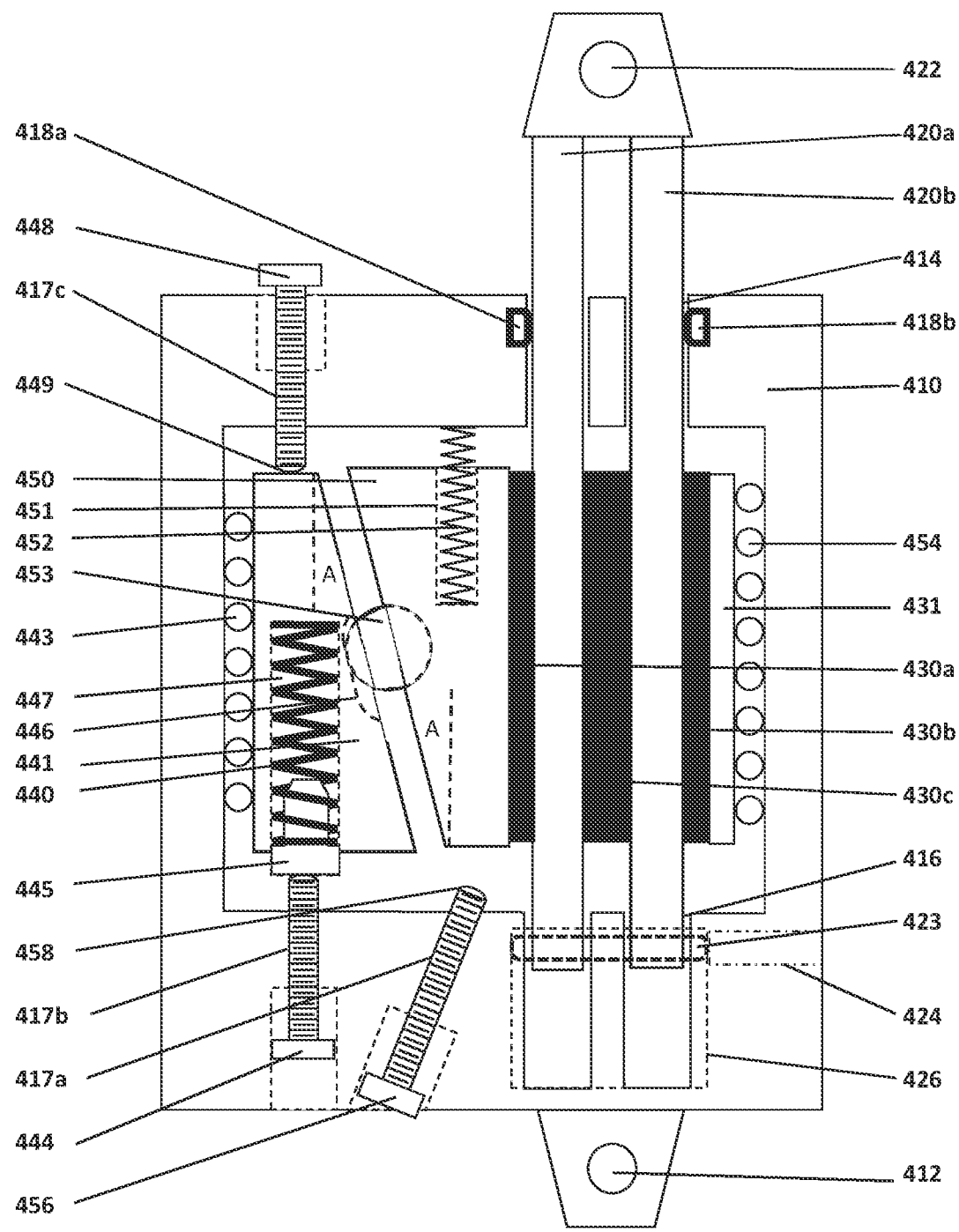
FIG. 4 is a cross-sectional view of an embodiment that is a variant of the embodiment of FIG. 3, but with a clutch which is oriented to resist compression.

FIG. 4 shows a device which is an embodiment with certain aspects. A frame (housing, shell, backbone) 410 is attachable to a first surface at attachment fitting (clevis, ball end, eye) 412. Cover plates run parallel to the drawing plane and span the front and back of frame 410 and are fastened to it by conventional means but are omitted from the drawing for clarity. Frame 410 can be fabricated many ways, including forming or subtractive or additive manufacturing, or being based on an extrusion with the internal parts slid in through the openings and then capped. Slide bars (rod, tube, angle, extruded shape) 420a and 420b are attachable to a second surface at attachment fitting (clevis, ball end, eye) 422, and are slidably attached to frame 410 passing through milled slots (holes, profile openings) 414 at the top of FIG. 4 and through milled slots (holes, profile openings) 416 lower on FIG. 4. The slide bars 420a and 420b can slide an indefinite length with respect to the frame 410. An end stop pin (retainer, snubber) 423 is installed crosswise through both slide bars 420a and 420b to keep them from sliding too far out of the frame 410. The pin 423 can be installed through access hole 424 and threaded into a tapped hole in one of the bars 420a or 420b. A cavity 426 accommodates the movement of the pin 423 when the bars 420a and 420b are sliding. Many other similar methods to implement an end-stop are known to those skilled in the art. Brake pad 430c is sandwiched between bars 420a and 420b. Each of the brake pads 430a, 430b, and 430c is slidably attached to both the frame 410 and the slide bars 420a and 420b. Each of the brake pads 430a, 430b, and 430c can slide an indefinite distance with respect to the bars 420a and 420b. Each of the brake pads 430a, 430b, and 430c can slide with respect to the frame 410 until contacting the inside top or inside bottom surfaces of the frame 410. Brake pad 430a is bonded to a member dubbed a trigger 450. Brake pad 430b is bonded to backing plate (strongback, spreader plate, spreader) 431b. Plate 431b is slidably connected to frame 410, and slides with brake pad 430b.

Though this embodiment has two slide bars 420a and 420b, and three brake pads 430a, 430b, and 430c, an indefinite number of each could be added, one of each at a time in keeping with the sandwiching pattern. There could be more than one piece of material comprising a brake pad in each sandwiched layer, but for simplicity only one is shown. The brake pad also need not be homogenous, as each layer could have several sections each of which is optimized for a given sliding velocity. Also, though the slide bars are shown as having a rectangular cross section, this need not be the case, and different cross-sectional profiles of slide bar could have multiple faces that could accommodate a plurality of brake pads, per sandwiched layer. That fact is of particular benefit to embodiments like this one in which the slide resistance is in the compression direction and thus the slide bars are resisted on pushing. Embodiments like this should be designed with the slide bars stiff enough to withstand Euler buckling to avoid disrupting their contact with the brake pads. In this embodiment, there are four frictional interfaces, one between brake pad 430a and slide bar 420a, one between slide bar 420a and brake pad 430c, one between brake pad 430c and slide bar 420b, and one between slide bar 420b and brake pad 430b.

Continuing with FIG. 4, trigger 450 has two opposing surfaces which are disposed at an acute angle to one another. An opening 451 in trigger 450 accommodates a trigger spring 452 which urges trigger 450 toward the vertex of the intersection of the two half-planes lying on the two opposing surfaces disposed at an acute angle to one another (the wedge vertex, although the trigger need not have an overall wedge shape). Spring 452 urges with a relatively light force. A set of rollers 454 is interposed between plate 431b and the right inside right wall of the frame 410. The rollers 454 are constrained by a retaining cage, not shown. The rollers 454 could be replaced by balls or similar low-friction interface. A low friction interface 453 is comprised of a single ball interposed between trigger 450 and a member dubbed a power wedge 441. The single ball of interface 453 is set into a low-friction spherical cavity on the face of trigger 450. The single ball of interface 453 is set into a low-friction cylindrical cavity 446 on the face of power wedge 441. A set of rollers 443 is interposed between power wedge 441 and the inside left wall of frame 410. The rollers are constrained by a retaining cage, not shown. The rollers 443 could be replaced by a set of balls or similar low-friction interface. Power wedge 441 has two opposing surfaces which are disposed at an acute angle to one another. A spring tensioning screw 444 inserts through a tapped hole 417b in the frame 410 and contacts the blunt end of a plunger 445. The smaller diameter end of plunger 445 inserts in the coils of a power spring 440. Power spring 440 is inserted into an opening 447 in power wedge 441. Power spring 440 urges power wedge 441 toward the vertex of the intersection of the two half-planes which lie on the two opposing surfaces disposed at an acute angle to one another (the wedge vertex, although the power wedge need not have an overall wedge shape). The depth to which screw 444 is threaded determines the pre-tension on power spring 440. Spring 440 urges with a relatively strong force. A power wedge adjustable stop screw 448 threads into a tapped hole 417c in frame 410. The depth of screw 448 establishes the position of power wedge adjustable hard stop 449. The vertex end of power wedge 441 contacts stop 449. A trigger adjustable stop screw 456 threads through the frame 410 at tapped hole 417a. The depth of screw 456 establishes the position of the trigger adjustable hard stop 458.

The vertex end of trigger 450 points toward stop 458.

There are three distinct operational configurations of the device, which have the following dubbed names as follows:

Unclutched—in which the vertex end of the power wedge (x41) is firmly in contact with either a fixed hard stop (x19) or adjustable hard stop (x49) and the vertex end of the trigger (x50) is not in firm contact with either a fixed hard stop (not shown in these embodiments) or adjustable hard stop (x58). In this configuration, the brake pad(s) (x30*) and the slide bar(s) (x20*) are biased together by the relatively small force produced by the trigger spring(s) (x52) acting through the wedge angle of the trigger (x50). In this configuration, the device resistance to sliding in the direction opposite to the first direction of slide is small, no more than the pre-tension of the trigger spring(s) (x52).

Clutched—in which the vertex end of the trigger (x50) is in firm contact with either a fixed hard stop (not shown in these embodiments) or adjustable hard stop (x58), all brake pad(s) (x30*) are firmly in contact with their respective positions on the frame (x10), and the vertex end of the power wedge (x41) is not in contact with either a fixed hard stop (x19) or adjustable hard stop (x49). In this configuration, the brake pad(s) (x30*) are biased to the slide bar(s) (x20*) by the relatively large force produced by the power wedge spring(s) (x40) amplified by the wedge angle of the trigger (x50).

Transition—in which the vertex end of neither the trigger (x50) nor the power wedge (x41) is in contact with their respective stops. In this configuration, the force applied to bias the brake pad(s) (x30*) to the slide bar(s) (x20*) depends upon the direction of sliding movement, such that if the slide bars are sliding in the direction which would eventually result in the Clutched configuration, then the bias is from the relatively large force produced by the power wedge spring(s) (x40), and if the slide bars are sliding in the opposite direction then the bias is from the relatively small force produced by the trigger spring(s) (x52).

Operation

FIG. 1 shows one embodiment of the device disclosed by the present disclosure. In this embodiment, the device is configured to resist extension and freely allows compression. Frame 110 is attachable to a first surface at fitting 112. Frame 110 supports, guides, and constrains some of the other components to facilitate the overall functioning of the device. Slide bars 120a and 120b are attachable to a second surface at fitting 122 and are slidably attached to frame 110. Slide bars 120a and 120b can slide an indefinite length with respect to the frame 110, limited only by their length. For simplicity of explanation, the following description assumes that frame 110 is fixed, and other parts move, although all motions between members is relative.

In the absence of external factors acting upon the device, the device is in Unclutched configuration, which is the configuration shown in FIG. 1. Spring 152 urges trigger 150 upward in the drawing with a relatively light force, with a target of approximately five psi normal force exerted at the interface between pad 130a and bar 120a. This may be calculated by multiplying the pre-tension force of spring 152 by the cotangent of the wedge angle A of trigger 150 divided by the area of the frictional interface. This light force brings all the following components in the following "stack list" for this embodiment into contact with one another at the interfaces as shown:

trigger 150 with swivel 132,
swivel 132 with plate 131b,
(plate 131b is bonded to pad 130a),
pad 130a with bar 120a,
bar 120a with pad 130c,
pad 130c with bar 120b,
bar 120b with pad 130b,
(pad 130b is bonded to plate 131a),
plate 131a with interface 154,
interface 154 with right inside of frame 110, and
trigger 150 with interface 153,
interface 153 with wedge 141,
wedge 141 with interface 143,
interface 143 with left inside of frame 110.

Continuing in FIG. 1, in which this embodiment of the device is shown in the Unclutched configuration, if external factors act to slide the device in extension, slide bars 120a and 120b are pulled upwards. Due to the relatively high friction between pad 130a and bar 120a, plus the relatively low friction between trigger 150 and wedge 141 (across interface 153), plus the fact that pad 130a, plate 131b, swivel 132, and trigger 150 are all mechanically locked to slide together in translation causes pad 130a, plate 131b, swivel 132, and trigger 150 to be pulled upward as well. This causes an increase in the contact forces between each component in the stack list. The key to this automatic clutching is that the trigger 150 translates together with the brake pad 130a and slips with respect to power wedge 141. It is important for the device to be capable of switching from one operational configuration to another such that the trigger 150, power wedge 141, brake pads 130a, 130b, and 130c, backing plates 131a, and 131b, are all able to translate at least a small distance with respect to the frame 110.

In this embodiment, any extension of the device from the Unclutched configuration places the device into the Transition configuration. In the Transition configuration, extension is opposed by the downward force produced by spring 140. In this embodiment, the farther the device slides in extension, the greater the force applied by spring 140.

Continuing, if the external factors acting on the device are enough to overcome the force of spring 140, then the device will slide in extension. Due to the low-friction interfaces 143 and 153, the downward force from spring 140 is largely undiminished by friction. If the external factors acting on the device are equal to the force of spring 140, the device will remain stationary (in the Transition configuration). If the external factors acting on the device become less than the force of spring 140, the device will slide in compression. If the device slides far enough in compression, it will slide back to the Unclutched configuration.

If the device slides far enough in extension, the vertex end of trigger 150 and the top surface of plate 131b will contact adjustable hard stop 158, and the top surfaces of brake pads (130a, 130b, and 130c) and plate (131a) will contact the frame (110) at their respective spots. When this happens, the device is in the Clutched configuration. In the Clutched configuration, sliding in extension is opposed by the frictional forces developed from biasing the friction brake. This frictional force is equal to the force produced by spring 140, times the cotangent of angle "A", times the number of frictional interfaces (four in this embodiment), times the coefficient of friction at each frictional interface. If the external factors acting on the device are greater than this frictional force, the device will slide in extension. If the external factors acting on the device are equal to or less than this frictional force, but above the force of spring 140, the device will "hold fast" (in the Clutched configuration). If the external factors acting on the device decrease to less than the force of spring 140, the device will slide in compression (and the device will immediately shift to the Transition configuration, even if it has extended significantly from its original position).

The operation of this embodiment is independent of the slide position of the device. This embodiment can switch from one operational configuration and back again as needed, for an indefinite number of cycles, along any position of slide displacement, within the limits of the device.

There are three adjustment points in this embodiment. One adjustment is the pre-tension in spring 140, which can be made by tightening or loosening screw 144. The benefit of being able to adjust the pre-tension of spring 140 is that the pre-tension affects the force produced by the spring when in the Clutched configuration, and thus the overall frictional resistance of the device. Another adjustment is in the position of the hard stop 158 which can be made by tightening or loosening screw 156. The benefit of the capability to adjust the position of stop 158 is to establish the displacement range that the device is in the Transition configuration. The third adjustment is the position of the stop 149, which can be made by tightening or loosening screw 148. The benefit of the capability to adjust the position of stop 149 is related to the benefits of each of the other adjustments, as that stop 149 position also affects the pre-tension of spring 140, and effectively raises or lowers the position of all components in the stack list.

Some of the dimensions and representations in the figures are exaggerated for clarity of illustration. One factor that has been exaggerated is the angle "A", which in practice may be much smaller than shown. One aspect of the design of high-performance equipment is to get the most "performance" (however defined) out of a smaller, lighter package. Suggested practice is to use high-strength materials, keep angle "A" low, and keep the force from spring 140 and the number of frictional interfaces high. This will result in a small package that produces substantial resistive forces in one direction coupled with almost no resistance in the opposite direction.

Performance regarding ease of switching out of the Clutched configuration is improved by having low-friction interfaces at 153, 154, and 143. The low-friction interfaces are represented by rollers (or balls) to emphasize the importance of them being low-friction. These could also be lubricated interfaces. Without these interfaces being low-friction interfaces, the device will still function, but trying to extract the trigger 150 from its wedged position in the Clutched configuration would require significant downward force on the fitting 122 rather than simply reducing the upward force on fitting 122 to something less than the downward force produced by the spring 140.

The ball swivel 132 is included to help evenly distribute the force placed on the brake pad 130*a*. The ball swivel 132 compensates for planar irregularities and slight misalignment of the biasing vector to keep the maximum surface contact between the brake pads 130*a*, 130*b*, and 130*c* and slide bars 120*a* and 120*b*.

The embodiment shown in FIG. 2 is a variant of the embodiment disclosed in FIG. 1. Like the embodiment in FIG. 1, the embodiment in FIG. 2 resists extension. One difference from the embodiment in FIG. 1, however, is the absence of a ball swivel 132 and backing plate 131*b*. Instead, trigger 250 in the embodiment of FIG. 2 performs the functions performed by trigger 150 in the embodiment of FIG. 1, plus the additional functions performed by the backing plate 131*b* in the embodiment of FIG. 1. Trigger 250 is bonded to brake pad 230*a*. The function of switching into the three operational configurations of Unclutched, Clutched, and Transition remain the same. Another change is that while the adjustable stop screw 248 and adjustable hard stop 249 are implemented similarly to FIG. 1, in that they are threaded through the frame 210 at tapped hole 217*c* and in that the depth of screw 248 determines the position of adjustable hard stop 249, in FIG. 2 they have been enlarged to accommodate power wedge spring 240 and power wedge spring adjustment screw 244 being housed and concentrically mounted within. Mounting spring 240 and screw 244 concentric and within screw 248 is optional and could just as well have been mounted to the frame 210 similarly to FIG. 1 but doing so saves valuable space which is beneficial in many high-performance applications. The other change is that the method of pre-tensioning the power spring 240. In the embodiment of FIG. 1, this was done by screw 144 pushing downwards from the upper part of frame 110 upon plunger 145 which bears downwards upon spring 140. In the embodiment of FIG. 2, screw 244 threads into a tapped hole 217*b* in power wedge 241 and biases spring 240 upwards to the underside of frame 210 (through screw 248) which pushes downwards on screw 244. The force of the spring 240 thus remains downward upon power wedge 241.

The embodiment shown in FIG. 3 is a variant of the embodiments of FIGS. 1 and 2, but it also resists extension. Compared to the embodiment of FIG. 1, a ball swivel 132 and backing plate 131*b* are absent. The function performed by backing plate 131*b* in the embodiment of FIG. 1 is performed by trigger 350. Trigger 350 is bonded to brake pad 330*a*. The function of switching into the three operational configurations of Unclutched, Clutched, and Transition remain the same. The other change is that the low-friction interface 353 combines the rolling aspects of interface 153 in FIGS. 1 and 2, with the force distributing aspects of ball-swivel 132 of FIG. 1.

The embodiment shown in FIG. 4 is most like that of FIG. 3, except this embodiment resists compression instead of extension. Compared to the embodiment of FIG. 3, all components to the left of slide bar 420A until the left inside of frame 410 have been flipped as a group, with their orientation to one another and their functions remaining the same. There are two other changes. One change is a thickening of the way the slide bars 420*a* and 420*b* are represented. This is to reflect that the slide bars are being pushed under a load, and that they have to be embodied with enough stiffness to withstand Euler buckling whereas in FIG. 1 through FIG. 3 the slide bars (x20*) could be thinner as they are stressed under tension. Similarly, scuff strips 418*a* and 418*b* have been added as an option help guide and align the slide bars 420*a* and 420*b*. Once in the Clutched configuration, the pressure of the brake pads 430*a*, 430*b*, and 430*c* pressing upon the slide bars 430*a* and 430*b* is enough to keep them aligned.

One operational aspect of the device is to dampen relative motion between a first surface and a second surface in order to attenuate one or more parameters of interest. The parameters of interest include displacement, velocity, acceleration, jerk (d3x/dt3), force, shock, vibration, and sound. An aspect of the device achieves this operational aspect by converting kinetic energy to thermal energy. Energy conversion is through the selective application of a friction brake.

One aspect of the device is that the device in its various embodiments can remove some or nearly all the kinetic energy from the suspended system, at least within the limits of the device. This substantially eliminates the susceptibility to resonance amplification of the suspended system, no matter what the excitation frequency or the natural frequency of the suspended system (or frequencies, considering a general six-degree-of-freedom suspension), within the limits of the device. This aspect of the device is fundamentally different than the aspect of a spring, which converts kinetic energy to potential energy and then converts it back into kinetic energy.

Another aspect of the device is to resist sliding displacement with a substantially constant force that is substantially independent of sliding velocity. This aspect is substantially different than the aspect of viscous dampers which have a resistance proportional to a power function of the sliding velocity (typically, proportional to the square of the velocity).

An important beneficial feature of the present invention is that the sliding resistance in the Transition configuration is small compared to the fully-developed sliding resistance produced by the Clutched configuration. In the Transition configuration, even though the force applied to bias the brake pads (x30*) to the slide bars (x20*) may be the same as or nearly the same as the in the Clutched configuration, the sliding resistance is much less because the brake pads (x30*) are sliding with the slide bars (x20*). Full sliding resistance is only developed when all brake pads (x30*) are restrained from further sliding by contact with their respective spots on the frame (x10). The low-friction interfaces (x43 and x54) facilitate this low-resistance sliding in either direction when in the Transition configuration by reducing friction with the frame (x10). This feature is of particular benefit in applications where the device is to be used in an isolation mount designed to isolate against shock plus shock-induced vibration plus acoustic vibration. As is known to those skilled in the art, a softer isolation mount is more effective (provided there is no resonance) than a stiffer mount at attenuating the transmission of vibration energy. However, a soft mount will dead-bottom when subjected to a shock disturbance. For a combination shock-and-vibe isolation mount, one or more devices according to the present invention can be used in combination with some soft spring elements. The soft spring elements handle the vibration and acoustic isolation, and the one or more devices according to the present invention handle the shock and shock-induced vibration. In such an application, the devices according to the present invention should be set-up such that the Transition configuration spans the range of displacements expected from the acoustic and non-shock-induced vibrations. In this way, the performance of the shock mount depends solely on the soft spring mounts, unless the excursion exceeds a certain adjustable value, in which case the devices according to the present invention come into play, The present invention explicitly allows the possibility of using brake pads (x30*) of different lengths, or of forming the housing (x10) such that each brake pad (x30*) has to slide a different distance before being stopped by contact with its respective spot on the frame (x10). The benefit of doing this is a softer "phased" engagement of the device sliding resistance. As each brake pad (x30*) is halted from further sliding by contact with its respective spot on the frame (x10), its contribution is added to the overall frictional sliding resistance of the device. The drawback is that for a given shock energy pulse and a given peak resistance, gradually ramping to full resistance requires additional excursion range between a first surface and a second surface. Alternatively, the relative excursion between the first and second surfaces can be minimized by an embodiment of the present invention in which the brake pads (x30*) and the trigger (x50) all quickly come to rest against their respective stops (x58 or the frame x10). For all embodiments, it is a beneficial feature of the present invention that the sliding resistance immediately drops to a small value when the direction of slide is reversed (to the direction opposite of the first direction of slide). This feature helps the overall performance of isolation mounts in which devices according to the present invention may be installed, by not hindering the recovery of the payload to the pre-disturbance position. This feature preserves the capability to use softer springs in the isolation mount, which would otherwise not be possible as they would be unable to overcome the sliding resistance of other damping methods which might be considered for such isolation mounts.

Accordingly, several advantages of one or more embodiments disclosed herein are as follows: to provide an improved damper which when combined with one or more springs will improve the performance of isolation mounts, which resists motion in one direction while allowing free motion in the other direction, which can hold fast to prevent displacement of the payload unless external factors overcome its static friction, that has adjustable resistance, that has a substantially constant resistance as a function of stroke, that can cycle repeatedly and indefinitely, that can improve the shock protection of an isolation mount by either reducing the force transmitted from one surface to another or requiring less excursion between the two surfaces or a combination of each, that can improve the vibration attenuation of an isolation mount by enabling the use of softer springs, that can convert enough kinetic energy to thermal energy to substantially avoid resonance amplification at any frequency. Other advantages of one or more aspects of the present disclosure will be apparent to one of skill in the art.

The device could be used by itself in certain applications or may be combined with other components typical to damped suspensions such as springs, viscous dampers, brackets, and one or more frames to connect the components and support the payload. Some typical end-applications would be in cabinets to protect delicate objects or electronics from seismic activity or heavy winds, vehicle seating, thrill rides, gun recoil, and military uses.

An embodiment of the device disclosed herein is generically comprised of four required assemblies:

A frame assembly which is attachable to a first surface, which provides structural support to the other components, constraining their movement and enabling them to function properly.

A slide assembly which is attachable to a second surface and which is slidably attached to the frame assembly so that the device can slide in extension or compression.

A friction brake which can be selectively biased to either resist sliding in either extension or compression, or to not be biased and allow free sliding in extension or compression.

A clutch assembly which applies a bias to the friction brake when external factors would tend to slide the device in a first direction (either extension or compression depending upon the embodiment), and to not bias the friction brake when external forces slide the device in the direction opposite to the first direction.

Conventional materials are used to comprise devices according to the present invention. Standard engineering formulas and standard CAD programs may be used to design each of the components and the overall device. Standard formulas are used to ensure that each component has the requisite design strength, stiffness, bearing life, fatigue life, surface hardness, and corrosion resistance as applicable, to function properly in the expected operating conditions for the desired number of cycles. Recommended material for the slide bars (x20*) is either steel, stainless steel (304, 316, or 17-4), or titanium Gr-5. Steel may be used rather than stainless steel if the device is cycled frequently enough to scour corrosion products before they impact the coefficient of friction or otherwise hamper device function. Aluminum is not recommended for the slide bars even if anodized or hard-anodized, as its comparatively lower melting point will result in galling of the slide bars and fouling of the opposing surface with melted aluminum. As for the brake pad (x30*) material, several commercial materials have been found suitable, but best results have been from material with at least 5% rubber content or some grit content where the grit is harder than the surface hardness of the slide bars (x30*), or a combination of both. The rubber or grit content of the brake pad material only benefits the brake pad (x30a) associated with the trigger (x50). The rubber or grit content is to ensure sufficient frictional grab when the normal stress at the interface is on the order of five psi, which is not a certainty for all combinations of materials considering that commercial brake linings are formulated for service at 500-600 psi.

Concepts of Embodiment

Many useful shock-limiting applications are conceived. The present disclosure has applications for protecting a Payload housed in a structure as well as a Payload riding in a vehicle. Various seating systems, equipment foundations, cockpits, standing platforms, even entire chambers can be isolated from their host vehicle or their other surroundings. The present disclosure can also be implemented on the exterior of a vehicle, as a shock-limiting bumper to reduce the impact force of a head-on collision. The present disclosure could be installed on the exterior of a fixed structure, such a bridge abutment, to limit the force on the structure which may result from accidental vehicle impact. An amusement park thrill ride offering a vertical free-fall of several hundred feet and a "sudden" thrill stop at the end could be implemented. Another application is as a bumper system on the front end of a vehicle. Another application is in helmets for contact sports.

Now, therefore, the following is claimed:

1. A damper device, the damper device comprising:
   a slide assembly such that the damper device is slidable in a first direction and a second direction opposite from the first direction;
   a brake assembly configured to selectively resist sliding of the device;
   a force assembly configured to bias the brake assembly against the slide assembly; and
   a clutch assembly, wherein, responsive to sliding in the first direction, the clutch assembly is adjustable from an unclutched configuration to a clutched configuration to resist sliding of the device in the first direction, and wherein the clutch assembly comprises a biasing member applying a biasing force against the clutch assembly in the second direction, wherein the clutch assembly further comprises:
      a trigger comprising at least two opposing faces which are disposed at an acute angle to one another;
      at least one spring, which urges the trigger towards a vertex;
      a first friction interface which facilitates the brake assembly and the clutch assembly to slide with the slide assembly;
      a second friction interface, which is disposed between the trigger of the clutch assembly and the force assembly which facilitates the clutch and brake assembly to slide with the slide assembly relative to the force assembly; and
      a trigger hard stop, which has at least one surface configured to contact at least one surface of the trigger thereby preventing the trigger from sliding.

2. The damper device according to claim 1, wherein the force assembly comprises:
   at least one spring; and
   one or more guide features.

3. The damper device according to claim 1, wherein the force assembly is configured to produce adjustable amounts of force.

4. The damper device according to claim 3, wherein the force assembly further comprises a means of setting a specific amount of force.

5. The damper device according to claim 1, wherein a resistance to sliding in the first direction is substantially constant.

6. The damper device according to claim 1, wherein the brake assembly and the slide assembly are configured in alternating sandwiching layers such that they establish multiple friction interfaces between them such that when the brake assembly is biased against the slide assembly each of the friction interfaces is biased to substantially the same force, such that each frictional interface contributes to an overall sliding resistance of the device by an amount substantially proportional to the force times a coefficient of friction at that frictional interface.

7. A clutch assembly for a damper, the clutch assembly slidable in a first direction and a second direction opposite from the first direction, wherein, responsive to sliding in the first direction, the clutch assembly is adjustable from an unclutched configuration to a clutched configuration to resist sliding in the first direction, and wherein the clutch assembly comprises a biasing member applying a biasing force against the clutch assembly in the second direction, the clutch assembly further comprising:
   a trigger wedge comprising a first vertex with a first angle; and
   a power wedge comprising a second vertex with a second angle wherein the second angle is equal to the first angle of the first vertex of the trigger wedge.

8. The clutch assembly of claim 7, wherein the first direction is compression or extension.

9. The clutch assembly of claim 7, further comprising at least one spring applying a force in a direction of sliding.

10. The clutch assembly of claim 7, further comprising a stopper configured to limit sliding of the clutch assembly.

11. The clutch assembly of claim 10, wherein the stopper is adjustable.

12. The clutch assembly of claim 7, wherein the trigger wedge is biased toward the first vertex at a first force and the power wedge is biased toward the second vertex at a second force which is greater than the first force.

13. The clutch assembly of claim 7, further comprising at least one first roller between the trigger wedge and the power wedge.

14. A damper device comprising the clutch assembly of claim 7 and a housing, wherein the clutch assembly is within the housing.

15. A damper device, the damper device comprising:
   a slide assembly such that the damper device is slidable in a first direction and a second direction opposite from the first direction;
   a brake assembly configured to selectively resist sliding of the device;
   a force assembly configured to bias the brake assembly against the slide assembly, wherein the force assembly comprises at least one spring and one or more guide features; and
   a clutch assembly, wherein, responsive to sliding in the first direction, the clutch assembly is adjustable from an unclutched configuration to a clutched configuration to resist sliding of the device in the first direction, and wherein the clutch assembly comprises a biasing member applying a biasing force against the clutch assembly in the second direction.

* * * * *